Feb. 21, 1933.     R. E. BRESSLER ET AL     1,898,812
SALT CONTAINER FOR ZEOLITE REGENERATION
Filed Aug. 10, 1929     2 Sheets-Sheet 1

Inventors:
Robert E. Bressler,
Douglas V. Moses,

Patented Feb. 21, 1933

1,898,812

UNITED STATES PATENT OFFICE

ROBERT E. BRESSLER, OF HAMMOND, AND DOUGLAS V. MOSES, OF EAST CHICAGO, INDIANA, ASSIGNORS TO GRAVER CORPORATION, OF EAST CHICAGO, INDIANA, A CORPORATION OF ILLINOIS

SALT CONTAINER FOR ZEOLITE REGENERATION

Application filed August 10, 1929. Serial No. 385,017.

Our invention relates to water softeners of the exchange method type and more especially to a salt container for zeolite regeneration.

Our invention comprehends water softening devices in which a zeolite regeneration action takes place and has to do principally with a quick and effective method and means for accomplishing the zeolite regeneration.

The ordinary hard water, which is the only kind available for many industrial purposes, contains not only salts of iron and aluminum but objectionable quantities of salts of lime and magnesia, which make the water unfit for many of the uses for which it is desired to be put, and it is necessary to soften the water by the removal particularly of lime and magnesia salts. Zeolite, which is the insoluble hydrated silicate of aluminum combined with an alkali or an alkaline metal or both, has the property of exchanging its base for another base, which is soda, and the lime and magnesia are retained by the zeolite and the sodium salts are released.

This process can not go on indefinitely, in as much as the zeolite must be rejuvenated or restored by permitting it to come in contact with a solution of sodium chloride, when the first exchange is reversed. The sodium of the salts substitutes itself for the absorbed calcium and magnesium and the resulting soluble calcium and magnesium chlorides are washed away with clean water. The salt solution is made strong enough to accomplish this quickly and effectively.

This process is well known in the art and need not be further explained in detail here.

It is an object of our invention to provide a salt container which will supply a regulated quantity of salt solution to the zeolite softener.

Another object is to provide a container for supplying salt solution having a maximum concentration and to follow this with a minimum concentration.

A further object is to provide a salt container in which the salt solution is prevented from being forced back into the water supply line due to the variation in pressure within the salt container.

Figure 1:
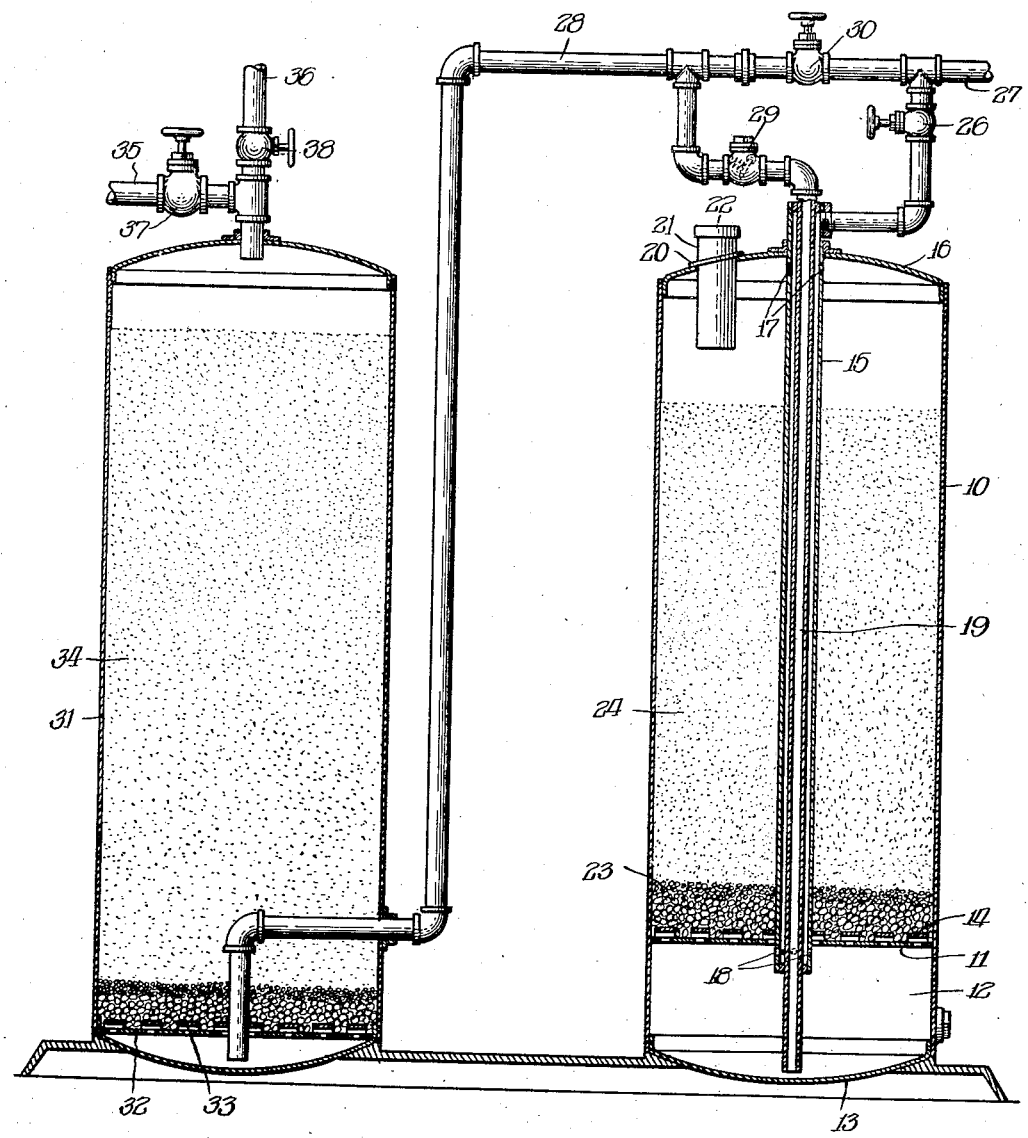
Figure 2:
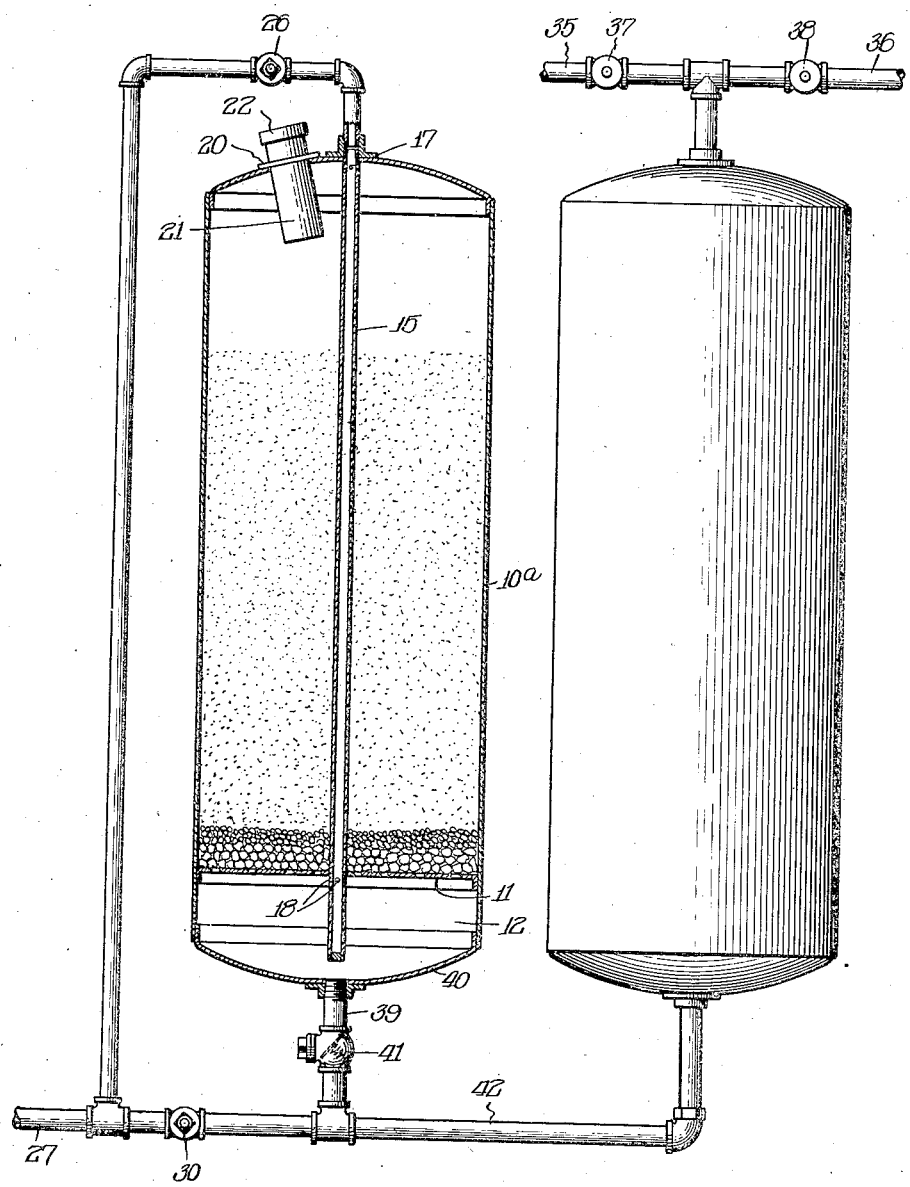

Other objects and advantages will become obvious from the following description, reference being had to the accompanying drawings, in which Fig. 1 is a view showing in sectional elevation a zeolite tank and salt container embodying our invention, and Fig. 2 is a similar view showing a modified form of salt container.

Referring more particularly to Fig. 1 in the drawings, we show a salt container tank having a shell 10 and a perforated plate 11 so placed as to leave a space 12 between it and the bottom 13 of the container. A baffle plate 14 is provided over plate 11 and a pipe 15 extends downwardly through cover 16 to a point below plate 11. Pipe 15 has an opening 17 in it near the top and within container 10 and a number of openings 18 near its lower end and just below plate 11. This construction is such that the holes 18 are near the top of space 12 for a purpose which will be explained hereinafter. A pipe 19 is located within pipe 15 and extends from near the bottom 13 of the container up through the top, but is open to the container only at its lower extremity. Cover 16 has an opening 20 in which is located a sleeve 21 through which salt may be introduced for filling the container, and a cap 22 tops this sleeve. A layer of gravel 23 is placed on plates 11 and 14 which serves as a bed for the salt 24. Pipe 15 is suitably connected through a valve 26 to the water supply line 27 and pipe 19 is connected to pipe 28 through a check valve 29. Pipes 27 and 28 are connected by a pipe section in which a valve 30 is placed. Pipe 28 leads, as shown, to the bottom of a tank 31, which has a perforated plate 32 containing a layer of gravel 33 on which rests a quantity of zeolite 34. Leading from the top of tank 31 are pipes 35 and 36, each provided with valves 37 and 38.

In Fig. 2 we have shown a modified form of a salt container in which the outlet pipe 39 from the salt tank 10a is in the bottom 40 of the tank and leads through a check valve 41 to pipe 42 leading to the bottom of the zeolite tank. The supply pipe 27 leads to the top of salt tank 10a through valve 26 and a shut-off valve 30 is provided which is similar to that shown in Fig. 1. In the arrangement shown in Fig. 2 supply pipe 15 is likewise provided with openings 17 and 18 near the top and just below the plate 11, respectively.

Having described the apparatus used for our invention, the operation is as follows:

With the zeolite tank 31 containing zeolite and with valve 30 open to the supply pipe 27 the hard water will flow through the zeolite bed in the bottom of tank 31 and be softened in its passage therethrough and is led off for use through pipe 36. The salt container 10 or 10a may be filled with salt through sleeve 21, valve 26 having first been closed to prevent an overflow of water through sleeve 21 and after the tank has been filled with salt and cover 22 replaced, valve 26 is opened. Fresh water will then fill the tank, flowing mainly through openings 18 in pipe 15, although opening 17 near the top will also permit of some flow of fresh water in the tank. Sleeve 21 extends downwardly in the container an appreciable extent, as shown, so that when the container is being filled with salt the salt level can not go higher than the lower end of sleeve 21. When the container is filled with water there will be a quantity of practically fresh water above the salt level and this will be maintained by a flow through opening 17.

The brine solution thus formed by the salt and the water will collect in space 12 below plate 11 and will be highly concentrated, because of the density of the salt, which creates a greater concentration at the bottom. When it is desired to rejuvenate or regenerate the zeolite, valves 30 and 38 are closed and valve 37 leading to waste pipe 35 is opened. The line pressure from pipe 27 will now force the brine solution in space 12 upwardly in pipe 19 and out through check valve 29 and pipe 28 through the zeolite tank 31.

The brine solution in passing through the zeolite will give up its sodium and takes up the calcium and magnesium chlorides which now pass out through waste pipe 35. After the desired amount of salt solution has been passed through the zeolite tank, valve 30 is opened and fresh water will be admitted to the zeolite tank, and after a period of washing, valve 37 is closed and valve 38 opened and the zeolite tank is now in normal operation for softening the water. As soon as valve 30 is opened the flow of brine through pipe 28 ceases because of the approximate equalization of pressure on the pipes leading to and from the salt container tank 10 or 10a.

Valve 26 is left open at all times except when salt is being put into the container and the flow of brine upward from the brine discharge pipe 19 is prevented by the action of check valve 29, which is spring operated and will not open under slight differences of pressure which may be set up on it as long as valve 30 is open. Valve 29 will open under full line pressure when valve 30 is closed. Valve 26 being normally open, the salt tank 10 or 10a will be developing a brine solution by the dissolution of the salt in the water while the zeolite softening process is taking place, and a highly concentrated volume will be formed in the chamber 12. By adjusting the height of plate 11 variations may be made of the capacity of chamber 12 which may be found desirable from time to time as determined by the quantity of brine solution found necessary for regenerating the zeolite tank. After the initial flow of the concentrated brine solution from chamber 12 there will be a flow of substantially clear water, flowing through apertures 18 in pipe 15. The action of regenerating the zeolite is then that of passing through it quickly first a concentrated quantity of brine and following this at once with a solution of practically clear water. In this manner regeneration of the zeolite is most rapid and, as our improved salt container will provide a quantity of brine of substantially maximum strength or a saturated solution ready whenever regeneration of the zeolite is required, there results a saving of time in the zeolite softening operation, which should be as short as possible, since during regeneration of the zeolite the softening process must be temporarily discontinued.

During the period of operation of the softener pressure variations may be encountered with a resultant expansion and contraction of the salt container. This contraction of the tank would result in brine being forced upward through pipe 15 and back through valve 26 into feed line 27 and carried into the zeolite tank while it is operating as a softener. This action is, of course, undesirable and is circumvented by having the opening 17 in pipe 15 near the top of the tank 10 or 10a. Opening 17 permits of a flow of fresh water into the top of the salt container and an appreciable volume of fresh water is maintained above the level of the salt and any contraction of the tank which would tend to force a back flow through valve 26 will only cause fresh water to be thus forced back, the opening 17 permitting this possible back flow from the top of the tank 10 or 10a into pipe 15.

Our invention has been illustrated with an upflow type of zeolite tank but it will operate equally well with the downflow softener.

Changes and modifications may suggest themselves, and we do not wish to limit our invention to the exact devices shown, which are understood to be illustrative only.

What we claim as our invention and desire to secure by Letters Patent is:

1. In a salt container for zeolite regeneration, in combination, a container having a salt chamber and a brine chamber, means for admitting brine to said brine chamber from said salt chamber, an inlet pipe opening separately into each of said chambers, an outlet pipe leading from said brine chamber, and means to control the flow of water to said chambers and the flow of brine from said brine chamber.

2. In a salt container for zeolite regeneration, in combination, a container having a salt chamber adapted to have a salt solution portion and a substantially fresh water portion, a brine chamber, a baffle plate separating said chambers, an inlet pipe having openings in each of said chambers, an outlet pipe leading from said brine chamber, and means to permit a flow of brine from said brine chamber and prevent the flow of brine into said inlet pipe.

3. In a salt container for zeolite regeneration, in combination, a salt container having a salt chamber provided with a portion for fresh water, a brine chamber in restricted communication with said salt chamber, an inlet pipe having openings adjacent the top of each of said chambers, an outlet pipe adapted to receive a discharge of brine from a point adjacent the bottom of said brine chamber, a check valve in said outlet pipe, and a shut-off valve between said inlet and outlet pipes.

4. In a salt container for zeolite regeneration, in combination, a container having a salt chamber and a brine chamber, a cover for said salt chamber, a filling sleeve in said cover extending into said chamber and adapted to provide fresh water space at the top of said salt chamber and to limit the quantity of salt that may be put into said chamber, an inlet to said salt chamber adjacent the top of said fresh water space, fresh water and brine inlets to said brine chamber, and an outlet from said brine chamber.

5. The combination of a zeolite softening tank and a brine supplying tank communicating therewith, said brine supplying tank including a brine chamber and a salt chamber so communicating that during the period of nonuse a body of substantially saturated brine will accumulate in said brine chamber, an outlet at one end of said brine chamber, means for supplying fresh water to a point in said brine chamber remote from said outlet, and means for simultaneously forcing brine from said salt chamber to said brine chamber.

6. The combination of a softening tank with a brine supply tank in communication therewith, said brine supply tank including a brine chamber and a salt chamber communicating therewith, and means for first supplying to said softening tank a brine of a predetermined maximum concentration and for thereafter supplying a brine of a predetermined concentration materially lower than said first mentioned concentration.

Signed at East Chicago, Indiana, this 24th day of July, 1929.

ROBERT E. BRESSLER.
DOUGLAS V. MOSES.